United States Patent [19]

Dettmer

[11] Patent Number: 4,523,766
[45] Date of Patent: Jun. 18, 1985

[54] CHUCK ASSEMBLY
[75] Inventor: Larry A. Dettmer, Waterloo, Iowa
[73] Assignee: Deere & Company, Moline, Ill.
[21] Appl. No.: 504,030
[22] Filed: Jun. 13, 1983
[51] Int. Cl.³ .............................................. B23B 31/18
[52] U.S. Cl. ....................................... 279/4; 279/1 S; 279/38; 279/107
[58] Field of Search ...................... 279/1 L, 4, 35, 38, 279/39, 40, 107, 1 S

[56] References Cited
U.S. PATENT DOCUMENTS

| | | | |
|---|---|---|---|
| 3,396,980 | 8/1968 | Muller | 279/4 X |
| 3,411,415 | 3/1966 | Benjamin et al. | 279/4 X |
| 3,863,753 | 2/1975 | Shank, Jr. | 279/37 X |
| 3,999,770 | 12/1976 | Sollami | 279/4 |
| 4,193,607 | 3/1980 | Pearson et al. | 279/1 L X |

OTHER PUBLICATIONS

Eaton Leonard Drawings 1-5 Relating to Collet Head Assemblies.

Primary Examiner—Z. R. Bilinsky

[57] ABSTRACT

A chuck mechanism includes an axially fixed part-positioning pilot coaxially surrounded by a fixed hollow closure sleeve. A cylindrical carrier slides within the sleeve and carries a plurality of part-engaging jaws. A dual area piston is pressure-operated and coupled to the carrier to move the carrier to open and close the jaws.

9 Claims, 2 Drawing Figures

CHUCK ASSEMBLY

BACKGROUND OF THE INVENTION

This invention relates to a chuck assembly for holding and positioning a workpiece and relates, in particular, to a chuck assembly for holding and positioning a tube with tube fitting mounted thereon.

In order to accurately bend hydraulic tubing into desired shapes, an end of the tube assembly must be securely held and accurately positioned. Tube holding chucks are available to perform this function. One such chuck has an over-center, lever-type linkage which is used to pivot axial tube-engaging jaws to a clamping position while simultaneously, axially moving a tube-locating pilot into engagement with an end of the tube. However, such chucks do not tolerate inconsistencies in tube parts sizes, even when those inconsistencies fall within normal part variation tolerances. For example, slightly undersized tube parts may slip when the chuck is rotated to reposition the tube, whereas oversized tube parts may be deformed by clamping pressure from the jaws. Furthermore, variation in part sizes can lead to undesirable variations in part locations since the over-center linkage may "lock up" with the tube-locating pilot in differing axial positions.

SUMMARY OF THE INVENTION

An object of the present invention is to provide a tube and fitting holding chuck assembly which securely holds tube parts of varying sizes.

Another object of the present invention is to provide a tube holding chuck assembly which consistently and accurately positions tube parts of varying sizes.

These and other objects are achieved by the present invention which includes an axially fixed, tube-locating pilot coaxially surrounded by an axially fixed jaw closure sleeve. A dual area piston is coupled to a hollow cylindrical jaw carrier which slides axially within the closure sleeve. A plurality of jaws are pivotal on an end of the carrier and operatively engageable with the closure sleeve so that axial movement of the carrier causes the jaws to clamp and unclamp. During a clamping operation, the jaws pivot into engagement with the tube fitting parts and then carry the tube into butting engagement with the axially fixed tube-locating pilot.

DETAILED DESCRIPTION

Figure 1:
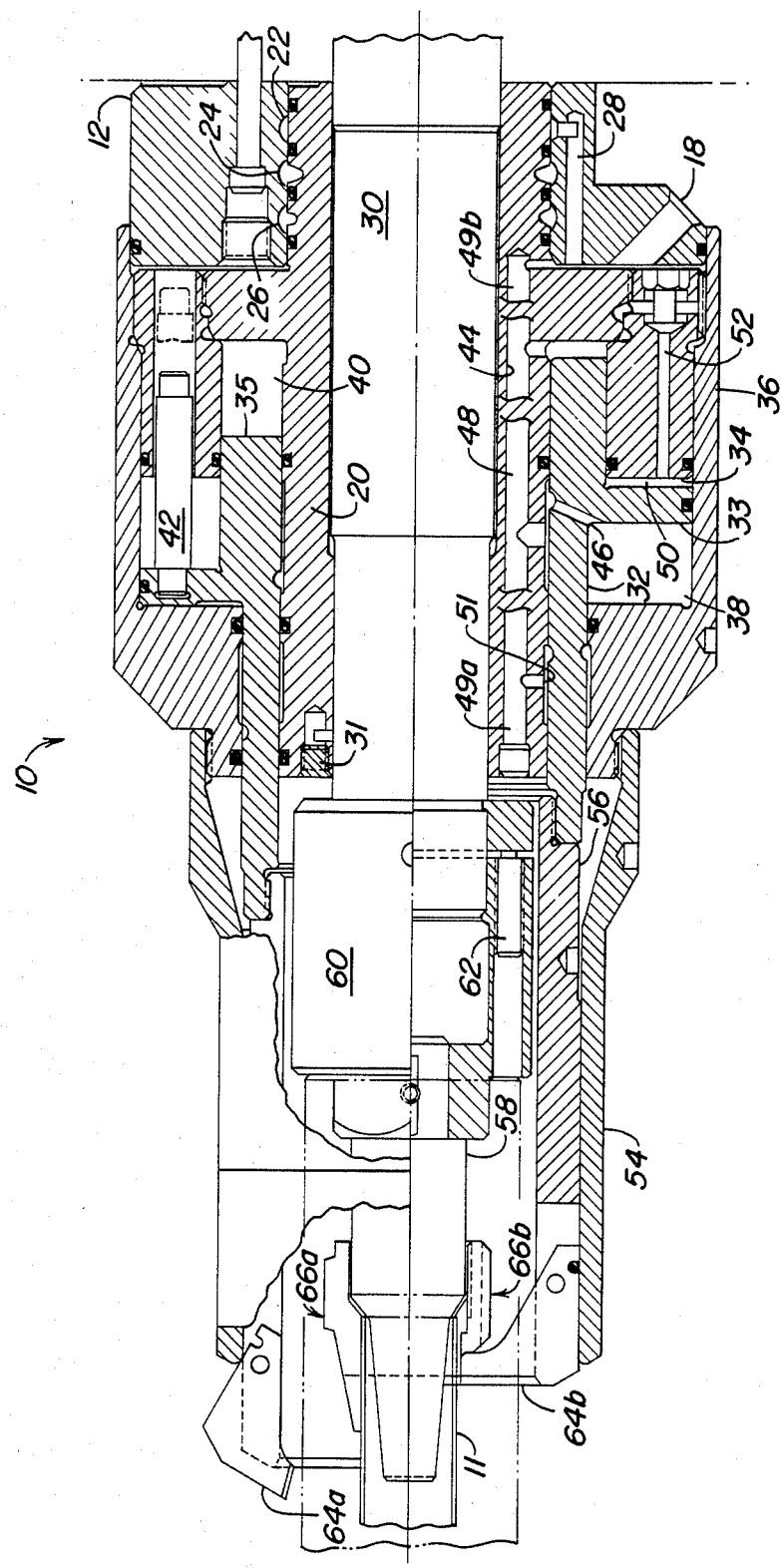
FIG. 1 is a partially sectioned, partially schematic view of a chuck assembly according to the present invention.
Figure 3:
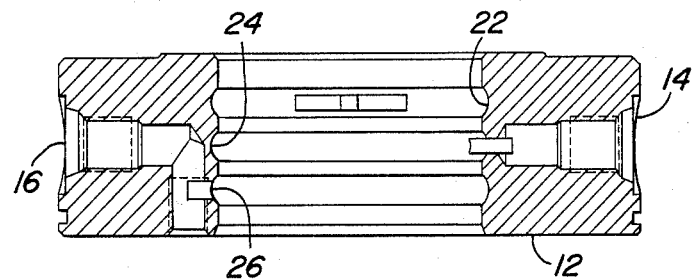
Figure 2:
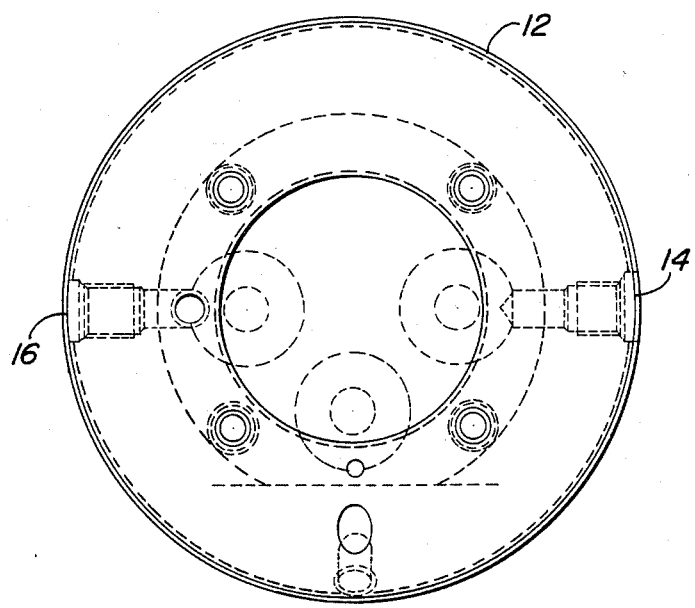
FIG. 2 is an end view of the port manifold of FIG. 1

The chuck assembly 10 for holding a tube 11 and fittings 66a or 66b includes a non-rotating port manifold 12 which has a clamping pressure inlet 14 and an unclamping pressure inlet 16 (shown in FIG. 2) and a drain port 18 (shown in FIG. 1). A mounting cylinder 20 has an end rotatable within the manifold 12. The cylinder 20 and the manifold 12 together enclose three annular grooves 22, 24 and 26 each sealed off by O-ring seals. Groove 22 is connected to drain port 18 via passage 28. As best seen in FIGS. 2 and 3, groove 24 is connected to clamping pressure inlet 14 and groove 26 is connected to the unclamping pressure inlet 16. The mounting cylinder 20 is wedge-locked for rotation with a machine spindle 30 by a plug inserted into tapered bore 31.

A hollow cylindrical piston 32 is coaxially and slidably mounted on the cylinder 20. An annular guide ring 34 is wedge-locked for rotation with cylinder 20 and cylindrical housing 36. Housing 36 and piston 32 enclose a clamping pressure chamber 38 (shown expanded in the lower half of FIG. 1). Ring 34, cylinder 20 and piston 32 enclose an unclamping pressure chamber 40 (shown expanded in the upper half of FIG. 1). At least one guide pin 42 fixed to piston 32 is slidably received by a corresponding bore in guide ring 34 so that piston 32 rotates with spindle 30, cylinder 20, guide ring 34 and housing 36. A passage 44 (partially and schematically shown) extends through cylinder 20 and connects the unclamping chamber 40 to the groove 26 and to inlet 16. A passage 46 in the piston 32 and a passage 48 (partially and schematically shown) in the cylinder 20 connects the clamping chamber 38 with annular groove 24 and clamping pressure inlet 14. Axial passages 49a and 49b (schematically and partially shown) connect drain port 18 with drain groove 51. Drain grooves 22 and 51 collect fluid leakage from the high pressure portions of the interior of chuck assembly 10. A third chamber 50 (enclosed by piston 32, ring 34 and housing 36) is connected to drain port 18 via passage 52 which extends through guide ring 34. Note that the annular area 33 of piston 32, exposed to clamping pressure in chamber 38, is larger than annular area 35, exposed to unclamping pressure in chamber 40.

A hollow cylindrical jaw closure sleeve 54 is fixed axially to and fixed for rotation with the housing 36. A hollow cylindrical jaw carrier 56 is slidably received by the closure sleeve 54 and is moved axially by movement of the piston 32.

A cylindrical pilot 58 with a tapered end is coupled to an end of spindle 30 by means of a collar 60. Pilot 58 is keyed for rotation with collar 60. A set screw 62 permits the pilot 58 (with collar 60) to be fixed in various axial positions with respect to spindle 30. A plurality of cicumferentially spaced jaws (64a and 64b) are pivotally attached to the outer end of the jaw carrier 56. Two different types of interchangeable jaws are illustrated in the figure. Above the centerline is shown a jaw 64a for use with a conventional flair nut-type tube fitting 66a (also shown above the centerline). Below the centerline is shown a jaw 64b for use with a conventional nut and sleeve type tube fitting 66b.

Mode of Operation

When it is desired to unclamp a tube fitting from the chuck assembly 10, an unclamping pressure signal is communicated to unclamping chamber 40. This causes piston 32 and jaw carrier 56 to slide axially away from manifold 12 to the position shown in the upper half of the figure. In this position, the jaws are positioned far enough outside of closure sleeve 54 so that the jaws may pivot to an open position permitting removal of the tube fitting.

When it is desired to clamp a tube and fitting in the chuck assembly, the pilot 58 may first be locked into a position which provides for the desired positioning of the tube fitting when the end of the tube is butted against the pilot 58. Then, a clamping pressure is communicated to chamber 38 causing piston 32 and jaw carrier 56 to slide axially to the right to the position shown in the lower half of the figure. This axial movement of the carrier 56 and the cooperation of closure sleeve 54 with the jaws causes the jaws to pivot into engagement with the tube fitting. When the jaws have engaged the tube fitting, then the jaws carry the tube flare axially into butting engagement with the pilot 58. At this point, the hydraulic pressure in chamber 38 assures that the tube fitting will be accurately positioned on the pilot 58 and securely clamped between the jaws (64a or 64b) and the pilot 58.

The spindle 30 may then be rotated to position the tube as desired for various operations, such as bending, since all elements of chuck assembly 10, except for manifold 12, rotate with the spindle 30.

With this chuck assembly, tube fittings of slightly differing sizes will all be held with a uniform clamping force which is determined by the clamping pressure in chamber 38. Similarly, parts of varying sizes will all be uniformly positioned because pilot 58 is fixed.

While the invention has been described in conjunction with a specific embodiment, it is to be understood that many alternatives, modifications, and variations will be apparent to those skilled in the art in light of the aforegoing description. Accordingly, this invention is intended to embrace all such alternatives, modifications, and variations which fall within the spirit and scope of the appended claims.

I claim:

1. A chuck mechanism for positioning a tube assembly comprised of a tube and tube fitting mounted on an end of the tube, the chuck mechanism comprising:
   an axially-fixed pilot having a tube-locating surface for engagement with the tube assembly;
   a hollow cylindrical axially-fixed closure sleeve coaxially surrounding at least a portion of the pilot;
   a hollow cylindrical carrier tube slidably mounted for axial movement within the closure sleeve;
   a plurality of circumferentially-spaced jaws pivotally attached to the carrier tube and operatively engageable with the closure sleeve; and
   pressure-operated, axially-movable piston means coupled to the carrier tube and responsive to an unclamping pressure signal for axially moving the carrier tube and jaws to a releasing position wherein the jaws pivot to disengage from the tube fitting and responsive to a clamping pressure signal for axially moving the carrier tube and jaws to a clamping position wherein the jaws pivot to engage the tube fitting and wherein the jaws move the tube into butting engagement with the axially-fixed pilot.

2. The chuck assembly of claim 1, further comprising:
   adjustment means for adjustably fixing the pilot at a plurality of fixed axial positions.

3. The chuck assembly of claim 1, wherein:
   the piston means comprises a dual area piston having a first larger area for exposure to a clamping pressure signal and having a second smaller area for exposure to an unclamping pressure signal.

4. The chuck assembly of claim 1, further comprising:
   an axially-fixed, hollow cylindrical body slidably receiving the piston means and cooperating therewith to define a releasing chamber and a clamping chamber, the body having first passage means for communicating the unclamping pressure signal to the releasing chamber and the body and the piston means having second passage means for communicating the clamping pressure signal to the clamping chamber.

5. The chuck assembly of claim 4, wherein:
   the piston means comprises a dual area piston having a first larger area for exposure to the clamping pressure signal and having a second smaller area for exposure to the unclamping pressure signal.

6. A chuck mechanism for positioning a tube assembly comprised of a tube and tube fitting mounted on a flared end of the tube, the chuck mechanism comprising:
   a pilot having a tube-locating surface for being received by and butting against the tube;
   attachment means for adjustably fixing the pilot at a plurality of fixed axial positions;
   an axially fixed cylindrical closure sleeve coaxially surrounding at least a portion of the pilot;
   a hollow carrier tube slidably mounted for axial movement with the closure sleeve;
   a plurality of circumferentially-spaced jaws pivotally attached to the carrier tube and operatively engageable with the closure sleeve; and
   pressure-operated, axially-movable piston means coupled to the carrier tube and responsive to an unclamping pressure signal for axially moving the carrier tube and jaws to a releasing position wherein the jaws pivot to disengage from the tube fitting and responsive to a clamping pressure signal for axially moving the carrier tube and jaws to a clamping position wherein the jaws pivot to engage the tube fitting and wherein the jaws move the tube into butting engagement with the axially fixed pilot.

7. The chuck assembly of claim 6, wherein:
   the piston means comprises a dual area piston having a first larger area for exposure to the clamping pressure signal and having a second smaller area for exposure to the unclamping pressure signal.

8. The chuck assembly of claim 6, further comprising:
   an axially fixed hollow cylindrical body slidably receiving the piston means and cooperating therewith to define a releasing chamber and a clamping chamber, the body having first passage means for communicating the unclamping pressure signal to the releasing chamber and the body and the piston means having second passage means for communicating the clamping pressure signal to the clamping chamber.

9. The chuck assembly of claim 8, wherein:
   the piston means comprises a dual area piston having a first larger area for exposure to the clamping pressure signal and having a second smaller area for exposure to the unclamping pressure signal.

* * * * *